United States Patent
Chefalas et al.

(10) Patent No.: US 10,438,253 B2
(45) Date of Patent: Oct. 8, 2019

(54) REUSE OF COMPUTING RESOURCES FOR CLOUD MANAGED SERVICES

(71) Applicant: International Business Machines Corporation, Armonk, NY (US)

(72) Inventors: Thomas E. Chefalas, Somers, NY (US); Clifford A. Pickover, Westchester, NY (US); Mahesh Viswanathan, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 14/953,375

(22) Filed: Nov. 29, 2015

(65) Prior Publication Data
US 2017/0155595 A1 Jun. 1, 2017

(51) Int. Cl.
*G06Q 30/06* (2012.01)
*G06F 9/455* (2018.01)
*G06F 9/50* (2006.01)

(52) U.S. Cl.
CPC ......... *G06Q 30/06* (2013.01); *G06F 9/45558* (2013.01); *G06F 9/5077* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,566,826 B2 | 10/2013 | Garmark | 718/1 |
| 8,706,701 B1 | 4/2014 | Stefanov et al. | 707/687 |
| 8,751,732 B2 | 6/2014 | Danilak et al. | 711/103 |
| 2006/0112342 A1* | 5/2006 | Bantz | G06F 21/50 |
| | | | 715/736 |
| 2010/0076856 A1 | 3/2010 | Mullins | 705/26.1 |
| 2013/0133085 A1* | 5/2013 | Tsujimoto | G06F 21/6245 |
| | | | 726/28 |
| 2013/0179289 A1* | 7/2013 | Calder | G06Q 30/08 |
| | | | 705/26.3 |
| 2013/0191528 A1 | 7/2013 | Heninger et al. | 709/224 |
| 2013/0290511 A1* | 10/2013 | Tu | G06F 9/5072 |
| | | | 709/224 |
| 2014/0094318 A1* | 4/2014 | Nguyen | G07F 17/32 |
| | | | 463/42 |
| 2015/0100752 A1 | 4/2015 | Flood | 711/171 |
| 2015/0269196 A1 | 9/2015 | Hillberg et al. | 707/814 |

FOREIGN PATENT DOCUMENTS

WO WO 2010088437 A2 8/2010 ............ G06F 15/16

OTHER PUBLICATIONS

Wei-Yu Lin; Guan-Yu Lin; Hung-Yu Wei, "Dynamic Auction Mechanism for Cloud Resource Allocation," Cluster, Cloud and Grid Computing (CCGrid), 2010 10th IEEE/ACM International Conference on , vol., No., pp. 591,592, May 17-20, 2010.

* cited by examiner

*Primary Examiner* — Angela Nguyen
(74) *Attorney, Agent, or Firm* — Ido Tuchman; Kristofer L. Haggerty (57) ABSTRACT

A system for managing cloud-based resources. The system includes a computer interface for receiving a computing resource. A computer including at least one central processing unit is configured to determine that the computing resource is abandoned and, upon determining the computer resource is abandoned, determine a disposition action for the computing resource.

17 Claims, 5 Drawing Sheets

REUSE OF COMPUTING RESOURCES FOR CLOUD MANAGED SERVICES

BACKGROUND

The present invention relates generally to computer networks, and more particularly to reuse of computing resources for cloud managed services.

Content management system usage may result in abandoned virtual machines (VMs), data, applications and other forms of "garbage." However, some of this garbage may actually be valuable. For example, some VMs are provisioned using well-known or standard configurations. Computing resources in such VMs may be reused in projects with similar configurations at lower costs than having to recreate the computing resources from scratch.

BRIEF SUMMARY

Accordingly, aspects of the present invention may provide a receiver of digital resources in a cloud environment and a means for automatically determining a disposition of computing resources for reuse. The determining of disposition may include computing resources reuse, computing resources auctioning, and computing resources resale.

One example aspect of the present invention is a system for managing cloud-based resources. The system includes a computer interface for receiving a computing resource. A computer including at least one central processing unit is configured to determine that the computing resource is abandoned and, upon determining the computer resource is abandoned, determine a disposition action for the computing resource.

Another example aspect of the present invention is a method for managing cloud-based resources. The method includes receiving a computing resource. A determining operation determines that the computing resource is abandoned. Upon determining the computer resource is abandoned, a disposition action for the computing resource is determined.

A further example aspect of the present invention is a computer program product for managing cloud-based resources. The computer program product includes computer readable program code configured to receive a computing resource, determine that the computing resource is abandoned, and, upon determining the computer resource is abandoned, determine a disposition action for the computing resource.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention, reference is made to FIGS. 1-5. When referring to the figures, like structures and elements shown throughout are indicated with like reference numerals.

In the course of using a managed cloud-based system and service, abandoned VMs, data, applications and other forms of computing resources may result. However, some of the computing resources may actually be valuable for selective reuse and even resale. Embodiments of the present invention include a receiver of computing resources in a cloud-computing environment and a means for automatically determining a disposition of computing resources for reuse. The computing resources may include data and applications. The determining of disposition may include computing resources auctioning and computing resources resale.

Figure 1:
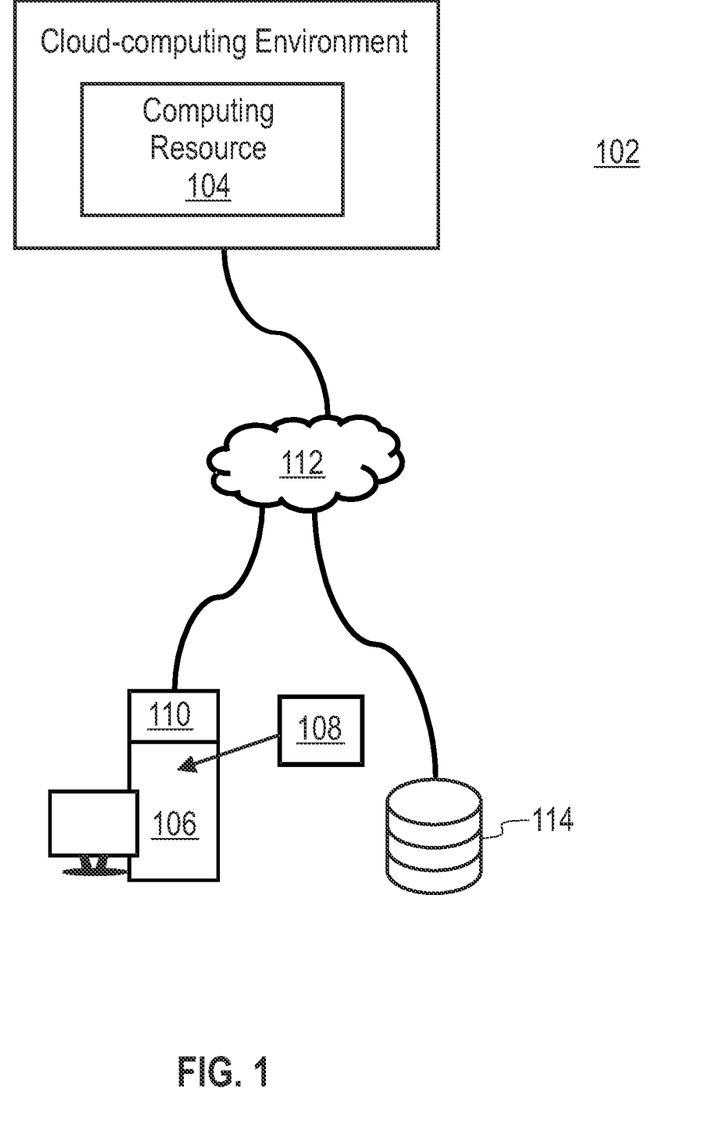
FIG. 1 shows a system for managing cloud-based resources according to one embodiment of the invention.

FIG. 1 shows a system 102 for managing cloud-based resources according to one embodiment of the invention. As used herein, "cloud-based resources" are computing resources provided to computers on-demand.

The system includes at least one computing resource 104 for potential disposition. In one embodiment, the computing resource 104 is available for migration in a cloud-computing environment. As used herein, a "cloud-computing environment" is a computing environment for delivery of on-demand computing resources. As used herein, a computing resource "available for migration" is a computing resource than can be migrated after use to a different computing platform. For example, the computing resource 104 may be a virtual machine that can be migrated to different host computers. A virtual machine is an emulation of a particular computer system that is instantiated on-demand. Alternatively, the computing resource 104 may be a cloud-based application. Cloud-based applications, or software as a service (SaaS), run on server computers that are owned and operated by third parties and that connect to users' computers via the Internet and, usually, a web browser. The computing resource 104 can also be a cloud-based computing platform. A cloud-based computing platform is a cloud-based environment with everything required to support the complete lifecycle of building and delivering cloud-based applications. It is contemplated that the computing resource 104 may also include data for a cloud-based application or platform.

The system 102 includes a computer 106 with at least one central processing unit (CPU) 108 and a computer interface 110. The computer interface 110 is configured to receive the computing resource 104 via a computer network 112.

The computer 106 is configured to determine whether the computing resource 104 is abandoned and, upon determining the computer resource 104 is abandoned, determine a disposition action for the computing resource 104. In one embodiment, the disposition action for the computing resource 104 may be purging from memory, cleansing, reselling or auctioning the computing resource 104. The auction can be, for example, an English, Dutch or Vickrey auction. The computer 106 may be configured to identify a buyer and seller of the computing resource 104.

The computer 106 may be configured to determine if disposition of the computing resource 104 for reuse violates a compliance rule. The disposition of the computing resource 104 may also be based on a determination of a security parameter, a licensing cost parameter, cost of installation parameter, and/or a data cleansing parameter. These parameters may be stored in a database 114. In one embodiment, the computer 106 is configured to determine a multidimensional decay surface including different usefulness decay rates for different classes of computing resources.

Figure 2:
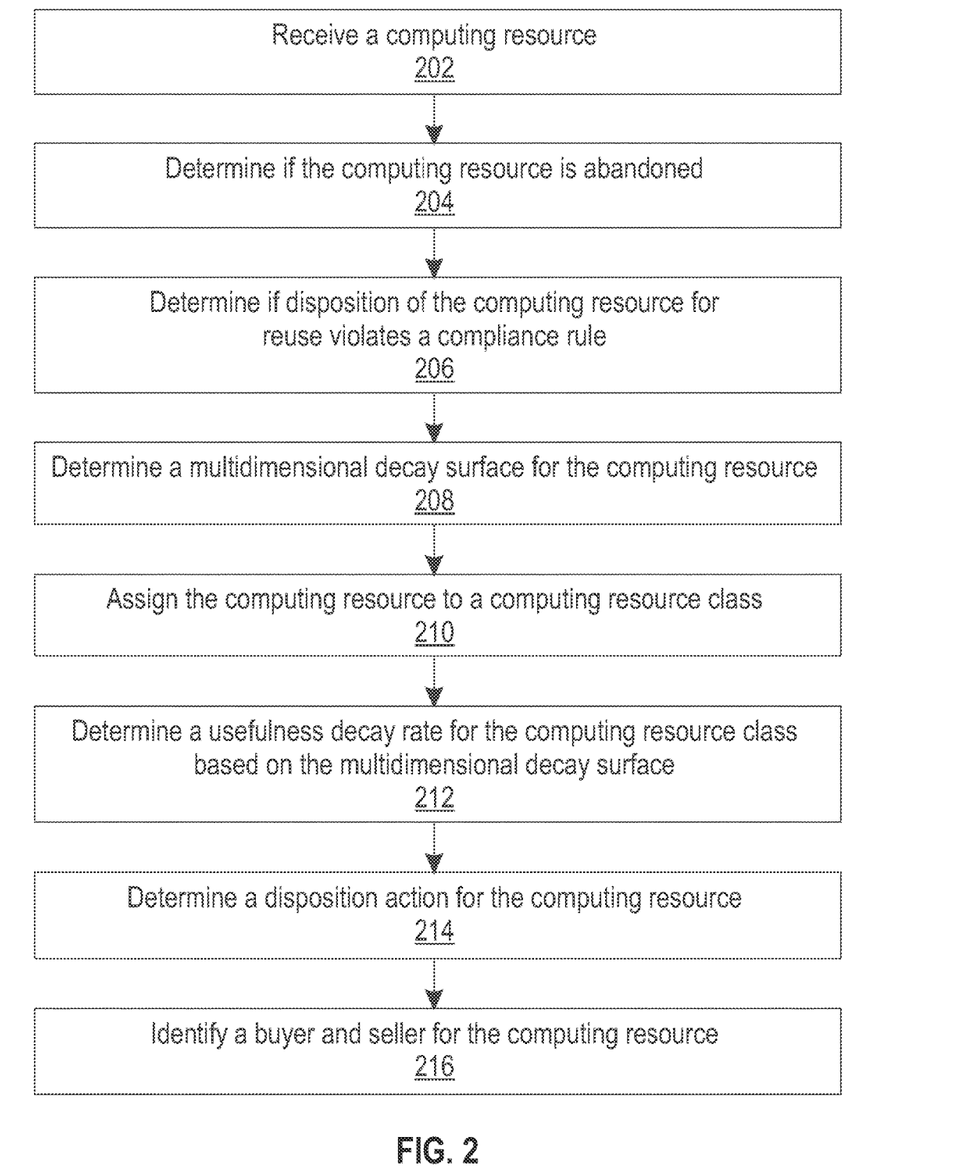
FIG. 2 shows one embodiment of a method for managing cloud-based resources according to one embodiment of the invention.

FIG. 2 shows one embodiment of a method for managing cloud-based resources according to one embodiment of the invention. The method includes receiving operation 202. During this operation, a computing resource is received by the management system. The computing resource may be available for migration in a cloud-computing environment. For example, the computing resource may be a virtual machine, cloud-based application, or data for a cloud-based application. For example, the computing resource could be abandoned data (public data or data for a fee) that could be useful by more than one person or organization, such as control parameters and settings for programs, data related to operating system functioning, map data, image data, "processed data" from one stage that may be considered the "raw data" of a next stage, experimental data generated within the context of a scientific investigation, census data, metadata, structural metadata (data about the containers of data), descriptive metadata (uses individual instances of application data or the data content). After receiving operation 202, control passes to determining operation 204.

At determining operation 204, the system determines if computing resource is abandoned. This determination may be based, for example, on VM logs. For instance, a VM that is left idle or unused for a long period time may be considered an abandoned computing resource. Another example is data that has not been modified or retrieved for a long time period could be considered an abandoned computing resource. If the computing resource is determined to be abandoned, control passes to determining operation 206.

At determining operation 206, the system determines if disposition of the computing resource for reuse violates a compliance rule, such as a FSIC regulation. If disposition of the computing resource for reuse does not violate a compliance rule, control passes to determining operation 208.

At determining operation 208, a multidimensional decay surface for the computing resource is determined. Disposition of the computing resource item may involve computation of multidimensional decay surface signifying different decay rates for different classes of computing resources. The multidimensional decay surface includes different usefulness decay rates for different classes of computing resources. After determining operation 208, control passes to assigning operation 210.

At assigning operation 210, the computing resource is assigned a computing resource class from the different classes of computing resources. For example, each resource may be defined by a vector of attributes, such as agility, API availability, cost, accessibility, maintenance, productivity, reliability, scalability, security, etc. After assigning operation 210, control passes to determining operation 212.

Figure 5:
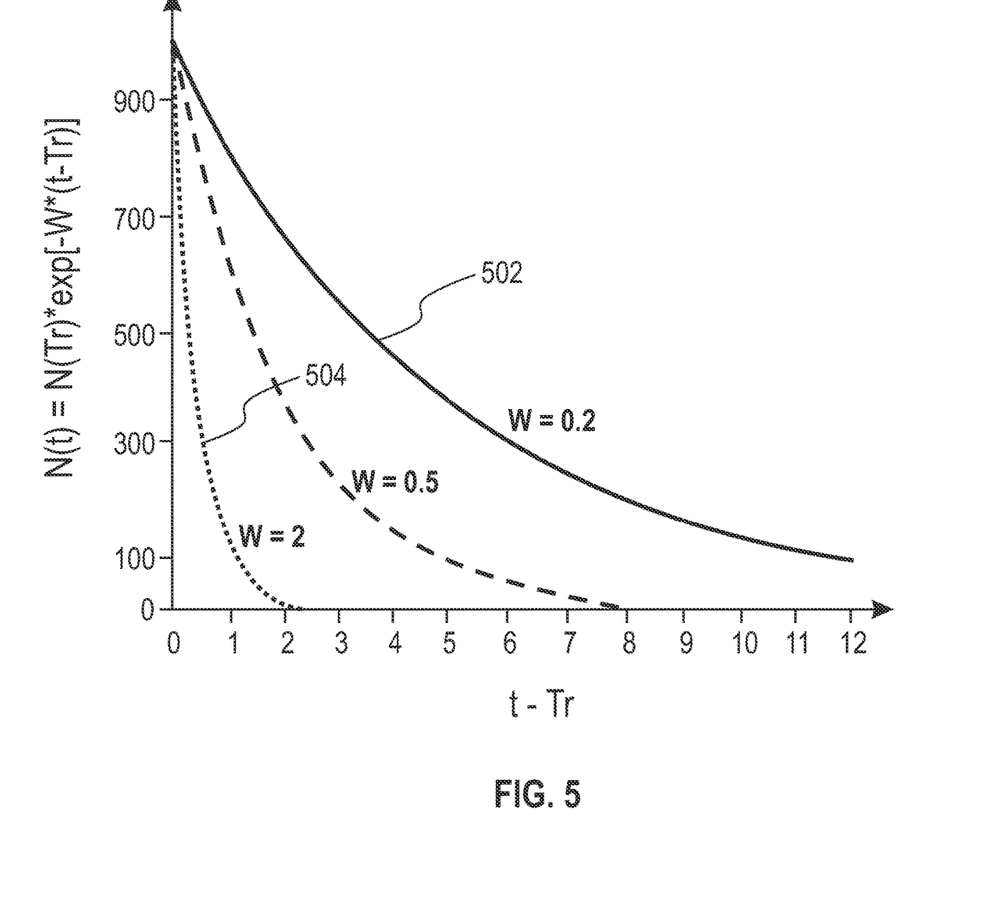
FIG. 5 shows an example of more valuable computing resources decaying more slowly than less valuable computing resources.

At determining operation 212, a usefulness decay rate for the computing resource class based on the multidimensional decay surface is determined. For example, FIG. 5 shows that more valuable computing resources may decay more slowly (top curve 502) than less valuable computing resources (bottom curve 504). This estimation of value may be learned via machine learning.

Returning to FIG. 2, after determining operation 212 is completed, control passes to determining operation 214. At determining operation 214, a disposition action for the computing resource is determined. The disposition action for a computing resource may include reselling and/or auctioning the computing resource. In one embodiment, determining the disposition action for the computing resource is based on the usefulness decay rate for the computing resource class. In one embodiment, determining the disposition action for the computing resource is based on determining a security parameter, a licensing cost parameter, cost of installation parameter, and/or a data cleansing parameter for the computing resource.

In one example, costs may involve a consideration of one or more of the following costs: 1) "cost to create a new resource" (e.g. cost may be time, monetary costs, risks, etc.), 2) "cost to destroy an existing resource," 3) "cost to abandon an existing resource and hold it for T days" (e.g. including cost of sanitizing an abandoned resource), and 4) "cost to resell an abandoned resource." In some embodiments, if "cost to create a new resource+cost to destroy an existing resource"<"cost to abandon an existing resource and hold it for T days+cost to resell an abandoned resource," then a resource provider module may automatically destroy the resource and create a new resource. After determining operation 214, control passes to identifying operation 216.

At identifying operation 216, a buyer and seller of the computing resource are identified. In one embodiment, the system uses a multi-attribute matching problem (MMP) to find a best trade for a given pair of trades. Such a configuration is discussed in detail at Yagil Engel, et al., "Bid expressiveness and clearing algorithms in multiattribute double auctions", Proceedings of the 7th ACM Conference on Electronic Commerce (EC '06), New York, N.Y., pp. 110-119 (2006), incorporated herein by reference in its entirety.

Figure 3:
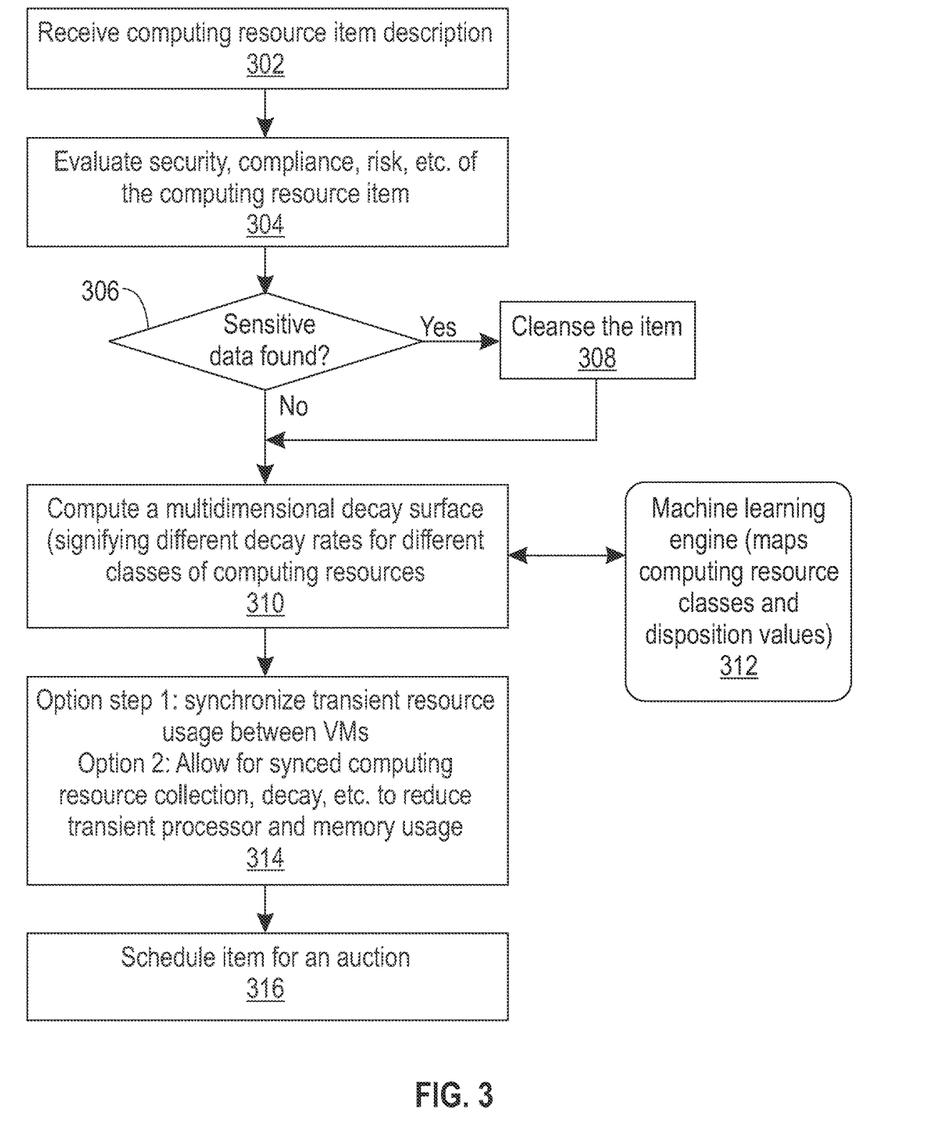
FIG. 3 shows an embodiment of a process for managing cloud-based resources, as contemplated by the present invention.

FIG. 3 shows an embodiment of a process for managing cloud-based resources, as contemplated by the present invention. At receiving operation 302, a description of the item resource is received by the management system. The item resource description may be, for example, a description of a VM configuration. In one embodiment, the management system may also expose an API to receive the item resource description. The management system may include a user interface for a user to manually enter the item resource description.

At evaluating operation 304, the security, risk and/or compliance of the computing resource item is evaluated. For example, the management system may review a resource to determine that no patient records would be transmitted during resale in violation of the Health Insurance Portability and Accountability Act (HIPPA) regulations. The evaluation operation 304 may include, for example, review of application logs, system logs and/or the item resource description. Security and risk evaluation may include performing a virus scan and checking for any misconfigured ports to determine a likelihood that the resource has been compromised by malware. The evaluation may include network monitoring for incoming and outgoing network connections, as well as a system event log review for past security threats.

At determining operation 306, the management system determines if sensitive data is found at the computing resource item. If so, the computing resource item is cleansed at cleansing operation 308. For example, a healthcare application may include personal data that is removed before offering the computing resource in the marketplace. The cleansing operation 308 may include anonymizing data instead of removing the data.

At computing operation 310, a multidimensional decay surface signifying different decay rates for different classes of computing resources is computed. For example, certain classes of computing resource items may decay very rapidly and may not have value in the marketplace once discarded. Other classes of computing resource items may decay slowly and may retain their value over a longer time period.

Figure 4:
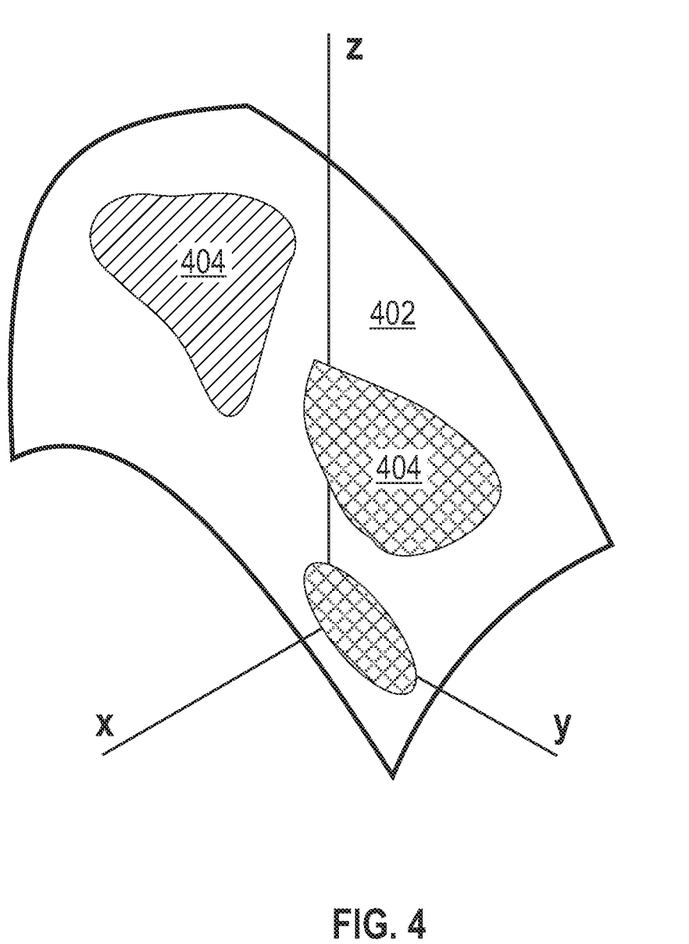
FIG. 4 shows an example multidimensional decay surface contemplated by the present invention.

FIG. 4 shows an example multidimensional decay surface contemplated by the present invention. The multidimensional decay surface 402 may include clusters or classes of computing resources 404 that decay at a similar rate over time. The multidimensional decay surface may include such parameters as availability (how quickly the computing resource item can be used), marketplace demand for the computing resource item, licensing dependencies and cost, installation difficulty and/or time in a new environment, destruction cost, etc. Parameter values may be based on user input, historical values, lookup tables, etc.

Turning back to FIG. 3, learning operation 312 may use machine learning to map computing resource classes to different disposition values. Thus, the system can continuously learn about different types of applications (e.g., consider defunct application binaries, application metadata and artifacts, and qualities of service and application requirements) and their corresponding decay values.

At operation 314, the process may include synchronizing transient resource usage between VMs. During this step, a distributed management system with multiple computing resource item evaluations may be synchronized. This step may allow for synchronized computing resource collection, decay, etc. to reduce transient processor and memory usage.

At scheduling operation 316, a multivariable auction is used to trade the computing resource items. This operation may include receiving requests for difference types of computing resource items. The system may facilitate bidding by, for example, querying computing resource items, their prices, and their properties. After bids are submitted, the system can confirm the bid and authenticate the bidder. The winning bidder can access and configure the computing resource item, and execute jobs on the computing resource item.

A computing resource item can be modeled as resource $x=(x_1, \ldots, x_n)$, where each resource is defined by a vector of attributes, such as agility, API availability, cost, accessibility, maintenance, productivity, reliability, scalability, security, etc. A configuration of a VM may include multiple resources. Thus, a configuration $X=\Pi^m_{j=1} x_j$. The set of trades can be modeled as $t=(X, q, b, s, \pi)$, where an agent b buys q>0 units of configuration X from seller s, for payment $\pi$. Set T is a set of all possible trades, where $T_i$ is a subset of T involving agent $b_i$.

Accordingly, the invention may include a service that includes a receiver of digital computing resources in a cloud environment and a means for automatically determining a disposition of computing resources for reuse. The computing resources may be data, applications and/or VM configurations. Determining of disposition of the computing resources can include computing resources auctioning and/or computing resources resale. This determination may include determining both a buyer and seller, creation of a fluid secondary market, and determining when computing resources are abandoned.

The determining the disposition of the computing resources may involve a consideration of security, risk, speed, and/or license reuse cost of the computing resources. In one embodiment, determining the disposition of the computing resources may involve a consideration of compliance characteristics (e.g., HIPAA). Determining the disposition of the computing resources may further involve computation of a multidimensional decay surface signifying different decay rates for different classes of computing resources (e.g., decay until, at some point, the computing resources is discarded, offered for lower cost, etc.). Determining the disposition of the computing resources may also include a consideration of needed disinfection of data to be performed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing cloud-based resources, the system comprising:
    a computer interface for receiving a cloud-based application;
    a computer including at least one central processing unit, the computer to:
        determine that the cloud-based application is abandoned based on examination of a resource log, the resource log indicating a period of time the cloud-based application has been unused; and
        upon determining the cloud-based application is abandoned, determine a disposition action for the cloud-based application based on at least a determination of a data cleansing parameter and a security parameter for the computing resource, the security parameter indicating a likelihood that the cloud-based application has been compromised by malware, the disposition action includes purging the cloud-based application from computer memory.

2. The system of claim 1, wherein the cloud-based application includes data for the cloud-based application.

3. The system of claim 1, wherein the disposition action for the cloud-based application includes one of reselling and auctioning the cloud-based application.

4. The system of claim 1, wherein the computer is configured to identify a buyer and seller of the cloud-based application.

5. The system of claim 1, wherein the disposition action for the cloud-based application is based on a determination of at least one of a security parameter, a licensing cost parameter, and a cost of installation parameter.

6. The system of claim 1, wherein the computer is configured to determine a multidimensional decay surface including different usefulness decay rates for different classes of computing resources.

7. The system of claim 1, wherein the computer is configured to determine if disposition of the cloud-based application for reuse violates a compliance rule.

8. A method for managing cloud-based resources, the method comprising:
    receiving data for a cloud-based application by a computer interface;
    determining that the data for the cloud-based application are abandoned based on examination of a resource log, the resource log indicating a period of time the data has been unused; and
    upon determining the data for the cloud-based application are abandoned, determining a disposition action for the data for the cloud-based application based on at least a determination of a data cleansing parameter and a security parameter for the data, the security parameter indicating a likelihood that the data has been compromised by malware, the disposition action includes purging the cloud-based application from computer memory.

9. The method of claim 8, wherein the disposition action for the data for the cloud-based application includes one of reselling and auctioning the data for the cloud-based application.

10. The method of claim 8, further comprising identifying a buyer and seller of the data for the cloud-based application.

11. The method of claim 8, wherein the disposition action for the data for the cloud-based application is based on determining at least one of a security parameter, a licensing cost parameter, and a cost of installation parameter.

12. The method of claim 8, further comprising:
determining a multidimensional decay surface including different usefulness decay rates for different classes of computing resources;
assigning the data for the cloud-based application to a computing resource class from the different classes of computing resources;
determining a usefulness decay rate for the computing resource class based on the multidimensional decay surface; and
wherein determining the disposition action for the data for the cloud-based application is based on the usefulness decay rate for the computing resource class.

13. The method of claim 8, further comprising determining if disposition of the data for the cloud-based application for reuse violates a compliance rule.

14. A computer program product for managing cloud-based resources, the computer program product comprising:
a non-transitory computer readable storage medium having computer readable program code embodied therewith, the computer readable program code configured to:
receive a computing resource;
determine that the computing resource is abandoned based on examination of a resource log, the resource log indicating a period of time the computing resource has been unused; and
upon determining the computing resource is abandoned, determine a disposition action for the computing resource based on at least a determination of a data cleansing parameter and a security parameter for the computing resource, the security parameter indicating a likelihood that the computing resource has been compromised by malware, the disposition action includes purging the cloud-based application from computer memory.

15. The computer program product of claim 14, wherein the computing resource is a virtual machine or cloud-based application.

16. The computer program product of claim 14, wherein the computing resource includes data for a cloud-based application.

17. The computer program product of claim 14, wherein the disposition action for computing resource includes one of reselling and auctioning the computing resource.

* * * * *